Dec. 8, 1959      A. D. CLAUSON      2,916,062
SPLITTER FOR PORTABLE ELECTRIC SAW
Filed Sept. 18, 1958
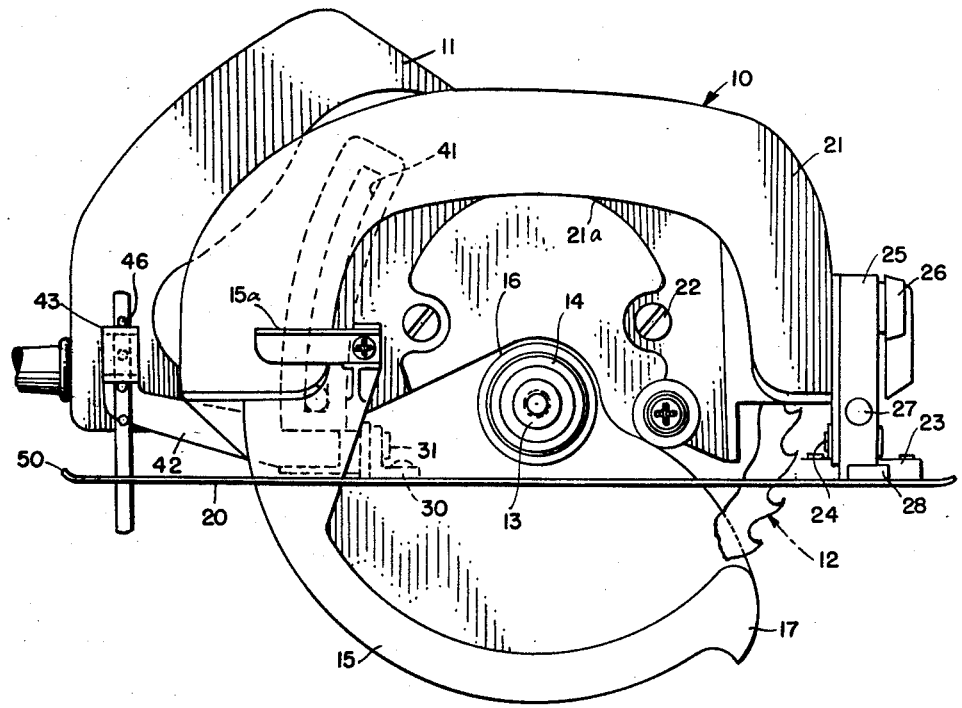
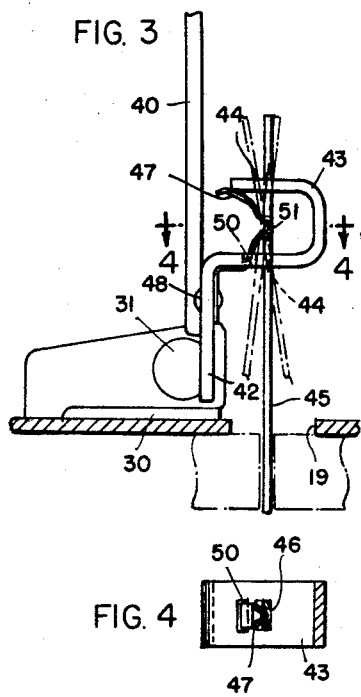
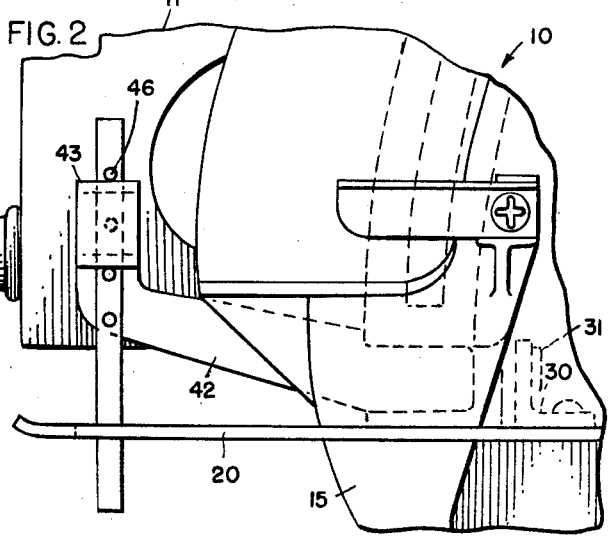
INVENTOR:
ARTHUR D. CLAUSON
ATT'YS

United States Patent Office 2,916,062
Patented Dec. 8, 1959

2,916,062

SPLITTER FOR PORTABLE ELECTRIC SAW

Arthur D. Clauson, Chicago, Ill., assignor to Dormeyer Corporation, Chicago, Ill., a corporation of Illinois Application September 18, 1958, Serial No. 761,776

3 Claims. (Cl. 143—159)

This invention relates to electric saws of the portable type in which the circular saw blade and the motor driving same are mounted upon a shoe for vertical and angular adjustment of the blade with respect to the shoe and the assembly is slidable on the shoe as a unit across a work piece.

With conventional portable electric saw blades other than those designed to make a finishing cut, sufficient set is generally provided in the teeth of the saw blade that a kerf is cut in a work piece much wider than the thickness of the body of the saw blade. This enables the saw blade to cut freely in the work piece without undue binding and jerking while being manually operated and also enables the saw to be steered by hand to make a cut along a predetermied line to remedy deviations that might otherwise occur. However, with this ability to steer which is built into the saw blade itself, it is readily apparent that the possibility of the saw wandering from a predetermined path is also increased, regardless of whether or not the saw is used with a rip fence or other rigidly disposed guide edges.

In those instances where a rip fence is employed the fence generally leads the saw ahead of the cut so that the saw is less likely to wander as compared with a construction in which the saw cuts ahead of or leads the rip fence. However, here again there is the possibility of lateral movement of the rear end of the saw away from the edge of the work piece contacted by the rip fence and deviation can occur without it being readily noticed.

It is not too difficult with even a novice handling an electric saw to make some kind of a cut with the saw under most conditions. However, if the shoe happens to encounter greater friction upon one side of the saw than upon the other, gradually or unexpectedly, the saw may be veered with a deviation from the intended line of cutting, or the operator might over-correct for the friction and cause a deviation in the other direction.

Consequently, it is one of the objects of the invention to provide a construction sometimes referred to as a splitter which projects into the kerf following the cut of the saw not only to reduce the tendency of the saw to wander as it is being pushed forwardly but also serves as a steady rest or support element whose cooperation with a work piece is sensed tactually by the operator to assist in directing the saw along a predetermined path.

Furthermore, the splitter also assists in preventing warpage strains in the lumber from closing the kerf and pinching the blade. Even when there is any tendency in the warpage to narrow the kerf being made, not only is its latitude restricted by the splitter but the sides of the narrowed kerf serves as a firmer steady rest to assist the operator in guiding the saw to make a predetermined cut.

A further object of the invention is to mount the splitter so that it is movable to remain within the plane of the saw blade by being mounted on an element controlled in conjunction with the adjustment of the saw.

The invention is also characterized by a splitter mounted within the outer confines of the shoe boundaries where it is protected and supported against damage and inadvertent changes of position with respect to the saw in the plane of the saw.

A further object of the invention resides in the arrangement by which a splitter is free to move laterally of the kerf to a limited extent in both directions under spring tension to permit the operator to redirect the saw a substantial degree if necessary.

The invention is also characterized by a splitter arrangement in which the splitter can be quickly adjusted vertically or even withdrawn without the need of tightening or loosening any supporting elements.

These being among the objects of the invention other and further objects include the ease of assembly and use and the rugged and simple construction which is easily handled and serviced by novices as described hereafter in connection with the drawings in which:

Fig. 1 is a side elevational view of an electric circular saw embodying the preferred form of the invention;

Fig. 2 is an enlarged view of the construction shown in Fig. 2 limited to the elements making up the splitter;

Fig. 3 is a rear elevational view of a construction shown in Fig. 2; and

Fig. 4 is a section taken upon the lines 4—4 in Fig. 3.

Referring now to the drawing in detail, the housing 10 for the motor (not shown) is mounted on a shoe 20 and has formed therewith an integral handle 11 by which the electric saw may be manipulated. The circular saw is indicated in part in phantom at 12 to show its forwardmost cutting edge, but is otherwise broken away to show the supporting parts which include a motor driven spindle 13 journalled in a bearing 14, a lower guard 15 rotatably mounted upon the bearing as at 16 for relative rotational movement concentric with the saw, and an overhead guard 21 covering the saw blade teeth completely about the shoe 20. The lower guard 15 has at its forward edge a toe 17 which engages the work piece (not shown) approximately simultaneously with the engagement of the saw with the work piece as urged forwardly by a spring (not shown) to a limit determined by a rubber bumper 23. Thereafter as the saw is pushed forward the work piece engages the toe 17 and drives the lower guard 15 rearwardly in an arcuate direction until the guard is moved to a position above the shoe 20 to expose the working arc of the saw to the work.

The overhead guard 21 is rigidly mounted to the end of the motor housing by screws 22 normally hidden from sight behind the saw blade. The guard 21 arches over edge of the saw which is disposed above the shoe 20, and is so constructed as to have an apron 21a extending outwardly and downwardly over the teeth of the saw so that access cannot be had normally by a person's finger or other instrument to the teeth of the saw above the shoe 20. However, the clearance provided by the guard 21 is such that it receives the guard 15 easily therein to a predetermined limit of rotation. The lower guard can also be rotated by hand by manipulation of a handle ear 15a thereon.

The motor and saw blade are mounted upon a shoe by means of upright flanges or brackets formed from or welded to the shoe 20. The mounting is such that the motor and saw can be tilted about a horizontal axis disposed parallel to the plane of the saw so that the saw can make any angular cut up to 45°, which is conventionally referred to as the tilt-cut. The saw is also supported for pivotal movement about a horizontal axis disposed perpendicular to the plane of the saw at the forward end thereof, so that the body of the saw can be raised and lowered thereabout with respect to the shoe to provide a predetermined depth to which the saw will cut.

Bracket 23 at the forward end of the saw supports a pivot pin 24 for the tilt of the saw and an arcuate member 25 having a slot therethrough (not shown) receiving a clamp nut 26 to secure the motor at any predetermined tilt position. Also located in the bracket 23 is the pin 27 which supports the front end of the motor housing in such a position with respect to the shoe 20 that the saw blade is located in a slot 19 (Fig. 3) in the shoe. Through the bottom of the bracket 23 is a rip fence receiving slot 28.

A rearmost bracket 30 receives in supported relationship a pin 31 which is coaxial with the tilt pin 24 in the front bracket. Journalled on the pin 31 is also a bracket 40 shown in Fig. 3 which has an arcuate slot 41 (Figure 1) for the reception of the clamp nut (not shown) by which the saw can be raised and lowered at the rear for depth adjustment about the pivot 27. The rear end of this bracket has an outrigger arm 42 on it, which is reversely bent upon itself in a U-form as shown at 43. Vertically aligned apertures 44 in sides of the U-form portion 43 receive a vertically disposed splitter blade 45 for a vertical or depth adjustment. To provide for this adjustment the splitter blade 45 has vertically spaced apertures 46 therein whereby it can be supported at any predetermined height by a blade spring 47 riveted to the main body portion of the bracket 42 by a rivet 48. The spring 47 is formed to follow the contour of the bracket 43 up to the lowermost opening 44 where it is bent upwardly to extend therethrough as at 50 and thereabove is provided with a detent 51 thereon engageable with the holes 46, selectively.

It will be observed that the slots are much wider than the thickness of the splitter blade and the spring 47 can yield inwardly toward the bracket 42 to permit the blade 45 to pivot about the outer edge of either one of the apertures 44 away from the outermost edge of the other aperture. This yielding freedom to move in either direction against the substantial tension of the spring 47 while the splitter blade 45 rests against at least one of the outermost edges of the openings 44 provides a tactual feel to the operator which steady rests against the kerf walls themselves and enables him to guide the saw down a predetermined line in a work piece.

It will also be noticed that the vertically spaced openings 44 permit a quite limited movement of the blade 45 fore and aft of the saw therefore supporting it rigidly for all practical purposes with respect to the forward movement of the saw without any strain upon any parts which might tend to loosen them or their adjustment. Moreover, the splitter 45 being mounted upon the bracket which pivots with the housing of the saw permits the splitter 45 to assume the tilt attitude of the saw blade in the slot 19 within the rearmost confines of the rear edge 50 of the shoe.

In operation whenever it is desirable to use the splitter, the splitter blade 45 can be inserted in place to a selected distance below the shoe where it is supported by engagement between the spring 47 and the appropriate detent 46 in the splitter blade. Thereupon the blade 45 tracks in the kerf made by the saw 12. Lateral movement of the saw at the rear end is allowed for in a limited sort of a way with a limited feel to the operator by the splitter blade 45 pressing the spring 47 laterally. The splitter blade 45 is limited positively in the magnitude of this movement in either direction by the tightness of the kerf and by the angle of the splitter blade in engaging opposite faces of the kerf. Thereby not only is some latitude permitted for steering but a final feel of complete firmness against further movement is also provided for the operator of the saw at a predetermined point in both lateral directions.

Having thus described the preferred embodiment of the invention and its method of operation it will be readily apparent to those skilled in the art that various changes can be made in the embodiment within the stated objects without departing from the spirit of the invention, the scope of which is commensurate with the appended claims.

What is claimed is:

1. In a portable electric saw of the type described having a motor driven saw blade carried on a work engaging shoe element, the combination of means for pivotally mounting the motor and saw blade for tilting the motor and blade with respect to the shoe about an axis parallel and adjacent to the plane of the blade in close proximity to the top of the shoe, means carried with respect to the saw blade for guiding the blade from the rear including a rearwardly projecting arm having an upright reversely bent portion provided with vertically spaced apertures therethrough disposed in the plane of the saw blade, a splitter element vertically slidable in said apertures and having support elements spaced vertically therealong, a spring supported upon said extension of the arm having an element cooperating with said elements and the splitter and yieldable inwardly to permit the splitter to be adjusted vertically and moved appreciably inwardly at either end.

2. In a portable electric saw the type described having a motor driven saw blade pivotally supported upon a work engaging shoe element having a saw slot therein, the combination of means including a bracket for pivotally mounting the motor and saw blade for tilting the motor and blade with respect to the shoe with the blade disposed in said slot about an axis parallel and adjacent to the planes of the blade and shoe, means supported on said bracket for guiding said saw including a rearwardly projecting arm movable with the tilting of the saw blade and having an upright portion provided with a vertically disposed guideway disposed in the plane of the saw blade, a splitter blade vertically slidable in said guideway and having support elements spaced vertically therealong, a spring supported upon said arm having a member cooperating with said elements to locate the lower end of the blade a predetermined distance below the shoe.

3. The combination called for in claim 2 including means carried by said projecting arm for supporting said blade against lateral movement thereof in the plane of said saw blade.

References Cited in the file of this patent
UNITED STATES PATENTS

| | | |
|---|---|---|
| 1,888,679 | Knapp | Nov. 22, 1932 |
| 2,257,459 | Gardner | Sept. 30, 1941 |
| 2,801,654 | Utz | Aug. 6, 1957 |
| 2,819,742 | Bleachly | Jan. 14, 1958 |